(12) United States Patent
Maeda et al.

(10) Patent No.: US 12,383,861 B2
(45) Date of Patent: Aug. 12, 2025

(54) GAS TREATMENT METHOD, AND GAS TREATMENT DEVICE

(71) Applicants: KOBE STEEL, LTD., Hyogo (JP); National University Corporation Tokai National Higher Education and Research System, Aichi (JP)

(72) Inventors: Norihide Maeda, Kobe (JP); Akira Kishimoto, Kobe (JP); Ken Nakanishi, Kobe (JP); Hiroshi Machida, Aichi (JP); Tsuyoshi Yamaguchi, Aichi (JP); Koyo Norinaga, Aichi (JP)

(73) Assignees: KOBE STEEL, LTD., Hyogo (JP); National University Corporation Tokai National Higher Education and Research System, Aichi (JP)

( * ) Notice: Subject to any disclaimer, the term of this patent is extended or adjusted under 35 U.S.C. 154(b) by 712 days.

(21) Appl. No.: 17/595,760

(22) PCT Filed: Apr. 10, 2020

(86) PCT No.: PCT/JP2020/016206
§ 371 (c)(1),
(2) Date: Nov. 23, 2021

(87) PCT Pub. No.: WO2020/241089
PCT Pub. Date: Dec. 3, 2020

(65) Prior Publication Data
US 2022/0226769 A1 Jul. 21, 2022

(30) Foreign Application Priority Data

May 28, 2019 (JP) .................................. 2019-099533
Jan. 7, 2020 (JP) .................................. 2020-001034

(51) Int. Cl.
*B01D 53/14* (2006.01)
*B01D 19/00* (2006.01)
(Continued)

(52) U.S. Cl.
CPC ...... *B01D 53/1425* (2013.01); *B01D 19/0005* (2013.01); *B01D 53/1418* (2013.01);
(Continued)

(58) Field of Classification Search
CPC ............ B01D 53/1425; B01D 53/1418; B01D 53/1475; B01D 53/1481; B01D 53/18;
(Continued)

(56) References Cited

U.S. PATENT DOCUMENTS

2013/0017144 A1 1/2013 Menzel
2013/0022534 A1 1/2013 Menzel
(Continued)

FOREIGN PATENT DOCUMENTS

JP H05-184862 A 7/1993
JP H06-086911 A 3/1994
(Continued)

OTHER PUBLICATIONS

JPH 0686911 A—English translation (Year: 1994).*
(Continued)

*Primary Examiner* — Anita Nassiri-Motlagh
(74) *Attorney, Agent, or Firm* — Studebaker Brackett PLLC

(57) ABSTRACT

An aspect of the present invention is a gas treatment method including: an absorption step of bringing a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release step of heating the absorption liquid brought into (Continued)

contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid.

3 Claims, 9 Drawing Sheets

(51) Int. Cl.
  *B01D 53/18* (2006.01)
  *B01D 53/50* (2006.01)
  *B01D 53/62* (2006.01)
  *B01D 53/96* (2006.01)
(52) U.S. Cl.
  CPC ..... *B01D 53/1475* (2013.01); *B01D 53/1481* (2013.01); *B01D 53/18* (2013.01); *B01D 53/507* (2013.01); *B01D 53/62* (2013.01); *B01D 53/96* (2013.01); *B01D 2252/20421* (2013.01); *B01D 2257/302* (2013.01); *B01D 2257/504* (2013.01)
(58) Field of Classification Search
  CPC ...... B01D 53/507; B01D 53/62; B01D 53/96; B01D 2252/20242; B01D 2257/504
  USPC ........................................................ 423/228
  See application file for complete search history.

(56) References Cited

U.S. PATENT DOCUMENTS

| | | |
|---|---|---|
| 2015/0174530 A1 | 6/2015 | Murai et al. |
| 2018/0193798 A1 | 7/2018 | Kishimoto et al. |
| 2018/0272269 A1 | 9/2018 | Goetheer et al. |
| 2019/0001259 A1 | 1/2019 | Matsuoka et al. |
| 2019/0143260 A1* | 5/2019 | Novek ............... B01D 53/1487 95/206 |

FOREIGN PATENT DOCUMENTS

| | | |
|---|---|---|
| JP | H08-089756 A | 4/1996 |
| JP | H10-249133 A | 9/1998 |
| JP | 2005-087828 A | 4/2005 |
| JP | 2012-106193 A | 6/2012 |
| JP | 2015-123380 A | 7/2015 |
| WO | 86/05474 A1 | 9/1986 |
| WO | 2017/033821 A1 | 3/2017 |
| WO | 2017/110569 A1 | 6/2017 |

OTHER PUBLICATIONS

JPH 10249133 A—English translation (Year: 1998).*
JP 2012106193 A—English translation (Year: 2012).*
The extended European search report issued by the European Patent Office on May 17, 2023, which corresponds to European Patent Application No. 20812686.2-1101 and is related to U.S. Appl. No. 17/595,760.

* cited by examiner

GAS TREATMENT METHOD, AND GAS TREATMENT DEVICE

TECHNICAL FIELD

The present invention relates to a gas treatment method and a gas treatment apparatus.

BACKGROUND ART

As a method in which $CO_2$ is recovered from a large-volume gas ($CO_2$-containing gas) containing carbon dioxide ($CO_2$), such as a power plant exhaust gas and a blast furnace by-product gas, various methods are used, and examples thereof include a chemical absorption method such as an amine absorption method. The chemical absorption method is a method in which an alkaline aqueous solution such as an amine aqueous solution is used as an absorption liquid, and a $CO_2$-containing gas is brought into contact with the absorption liquid to cause the absorption liquid to absorb $CO_2$, and the absorption liquid that has absorbed the $CO_2$ is then heated to release the $CO_2$ from the absorption liquid, thereby recovering the released $CO_2$.

Meanwhile, the absorption liquid in the chemical absorption method usually also absorbs acidic components other than $CO_2$. Specifically, in addition to $CO_2$, a sulfur compound such as $SO_x$ and $H_2S$ contained as impurities in the $CO_2$-containing gas is also absorbed by the absorption liquid. For this reason, the sulfur compound is mixed in $CO_2$ released from the absorption liquid that has absorbed the $CO_2$ in the $CO_2$-containing gas. In the chemical absorption method, among components contained in the $CO_2$-containing gas as a gas to be treated, only a component absorbed by the absorption liquid is recovered, and a component not absorbed by the absorption liquid is not recovered. Therefore, in the chemical absorption method, the $CO_2$ is also preferentially recovered, but the sulfur compound absorbed by the absorption liquid is also preferentially recovered. The concentration of the sulfur compound in the recovered gas is higher than the concentration of the sulfur compound in the gas to be treated.

The recovered $CO_2$ is used in various fields such as synthesis of chemicals (such as urea), dry ice manufacture, carbon dioxide capture and storage (CCS), and enhanced oil recovery (EOR). In any method in which the recovered $CO_2$ is utilized, the recovered $CO_2$ is required to reduce the concentration of the sulfur compound that may cause various problems such as pipe corrosion and catalyst deactivation as much as possible. The sulfur compound promotes an irreversible deterioration reaction of a component contained in the absorption liquid, for example, an amine. For this reason, when the recovery of $CO_2$ by the chemical absorption method is performed for a long period of time, the deterioration in the components contained in the absorption liquid proceeds, which causes an increased amount of the absorption liquid to be discarded. As a result, the amount of the absorption liquid to be added, that is, a makeup amine amount increases. In order to reduce the makeup amine amount, the amount of the sulfur compound accumulated in a gas treatment apparatus ($CO_2$ recovery apparatus) capable of recovering $CO_2$ by the chemical absorption method is also required to be small.

In order to satisfy these requirements, for example, a $CO_2$ recovery apparatus using a chemical absorption method includes a desulfurization device in the preceding stage thereof. That is, the problem related to the sulfur compound has been solved by using a gas from which the sulfur oxide has been removed in advance by the desulfurization device as a gas to be treated, introduced into the $CO_2$ recovery apparatus. Examples of such a technique include a desulfurization decarboxylation method described in Patent Literature 1.

Patent Literature 1 describes a desulfurization decarboxylation method including: a desulfurization step of bringing a gas containing sulfur oxide and carbon dioxide into contact with an absorption liquid containing a basic calcium compound to remove sulfur oxide from the gas; an advanced desulfurization gas cooling step of bringing the gas desulfurized in the desulfurization step into contact with a basic absorption liquid to further remove sulfur oxide so that a sulfur oxide concentration in the gas becomes 5 ppm or less, and cooling the temperature of the gas to 50° C. or lower; and a decarboxylation step of bringing the gas subjected to an advanced desulfurization gas cooling treatment in the advanced desulfurization gas cooling step into contact with an absorption liquid containing a basic amine compound to remove carbon dioxide from the gas. Patent Literature 1 discloses that the sulfur oxide contained in the gas after the desulfurization treatment is removed to suppress the accumulation of the sulfur oxide in the decarboxylation absorption liquid, and the amount of the amine compound in the absorption liquid accompanying an exhaust gas in the decarboxylation step can be reduced.

As described above, the desulfurization device is provided in the preceding stage of the $CO_2$ recovery apparatus using the chemical absorption method, whereby the installation of the desulfurization device leads to an increase in cost even if the concentration of the sulfur compound in the $CO_2$ to be recovered can be reduced. For this reason, it is desirable that the $CO_2$ recovery apparatus can recover $CO_2$ having a low concentration of the sulfur compound to be mixed even if the sulfur compound such as sulfur oxide is not removed in advance from the gas to be treated by the desulfurization device or the like. That is, in the chemical absorption method, there is a demand for a method in which high-concentration $CO_2$ can be recovered even if a $CO_2$-containing gas containing a sulfur compound or the like is directly treated as a gas to be treated.

CITATION LIST

Patent Literature

Patent Literature 1: Japanese Patent Application Laid-Open No. 2005-87828

SUMMARY OF INVENTION

The present invention has been made in view of such circumstances, and an object thereof is to provide a gas treatment method and a gas treatment apparatus capable of recovering high-concentration carbon dioxide.

An aspect of the present invention is a gas treatment method including: an absorption step of bringing a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release step of heating the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid.

Another aspect of the present invention is a gas treatment apparatus including: an absorption device that brings a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release device that heats the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid.

DESCRIPTION OF EMBODIMENT

As a result of various studies, the present inventors have found that the above object is achieved by the present invention described below.

Hereinafter, an embodiment according to the present invention will be described, but the present invention is not limited thereto.

As shown in FIGS. 1A to 1D, a gas treatment method according to an embodiment of the present invention is a method in which, the carbon dioxide is separated and recovered from a gas to be treated, which contains carbon dioxide and a sulfur compound, using an absorption liquid to be phase-separated by carbon dioxide ($CO_2$) absorption. FIGS. 1A to 1D are conceptual diagrams for illustrating a gas treatment method according to the present embodiment. In FIGS. 1A to 1D, sulfur oxide ($SO_x$) is described as the sulfur compound, but the sulfur compound is not particularly limited as long as it is a gaseous sulfur compound, and may be, for example, hydrogen sulfide ($H_2S$).

Figure 1:
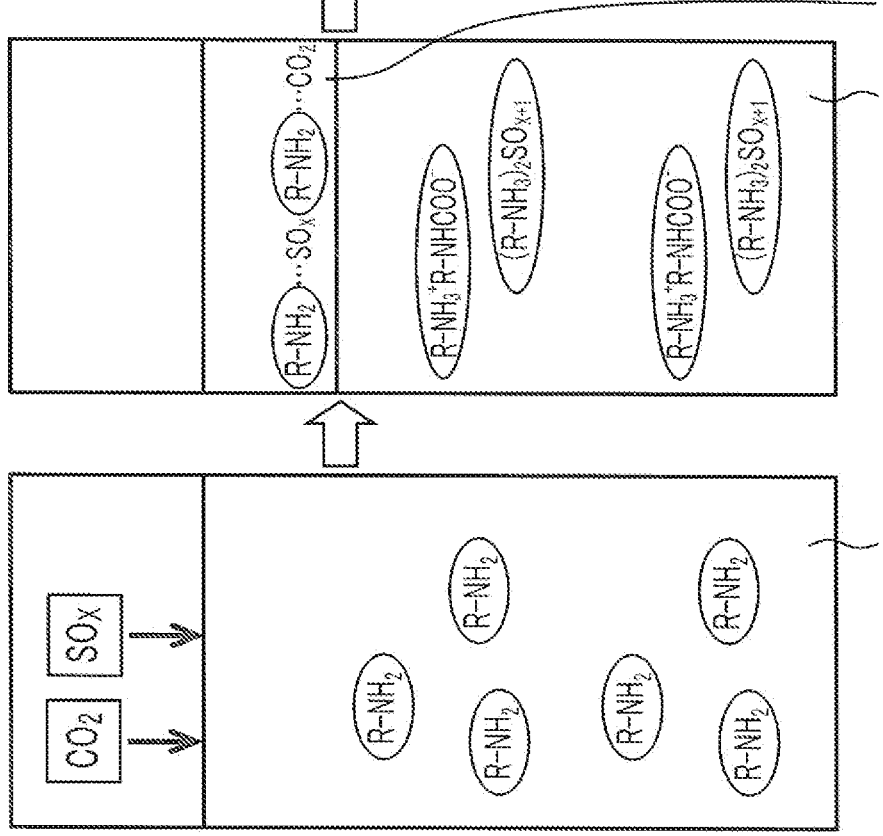
FIGS. 1A to 1D are conceptual diagrams for illustrating a gas treatment method according to an embodiment of the present invention.

In the gas treatment method, as shown in FIG. 1A, the gas to be treated, which contains carbon dioxide and a sulfur compound, is brought into contact with an absorption liquid 11 to be phase-separated by carbon dioxide absorption. Consequently, as shown in FIG. 1B, the carbon dioxide and the sulfur compound are absorbed by the absorption liquid 11. The absorption liquid 11 by which the carbon dioxide and the sulfur compound are absorbed is phase-separated into a first phase portion 12 and a second phase portion 13. As described above, the step of bringing the gas to be treated into contact with the absorption liquid 11 to absorb the carbon dioxide and the sulfur compound corresponds to an absorption step. As shown in FIG. 1B, by each of the first phase portion 12 and the second phase portion 13 thus phase-separated, the carbon dioxide and the sulfur compound may be absorbed in a different form. In FIG. 1A, a primary amine ($R-NH_2$) is described as a component contained in the absorption liquid 11, but the component is not particularly limited as long as it is a component constituting the absorption liquid to be phase-separated by carbon dioxide absorption, that is, a component that associates with carbon dioxide to contribute to the phase separation of the absorption liquid. The component is not limited to the primary amine, and examples thereof include a secondary amine and a tertiary amine. FIGS. 1B and 1C respectively describe an aggregate state between carbon dioxide and a primary amine ($R-NH_2$) and an aggregate state between a sulfur compound and a primary amine ($R-NH_2$) in each of the first phase portion 12 and the second phase portion 13 by exemplifying a case where a primary amine ($R-NH_2$) is used as a component contained in the absorption liquid 11 and the sulfur compound is sulfur oxide ($SO_x$), but the present invention is not limited thereto.

In the gas treatment method, after the absorption step, the absorption liquid 11 (the first phase portion 12 and the second phase portion 13) brought into contact with the gas to be treated is heated to a temperature equal to or higher than a temperature at which the carbon dioxide absorbed by the absorption liquid 11 is released from the absorption liquid 11 and lower than a temperature at which the sulfur compound absorbed by the absorption liquid 11 is released from the absorption liquid 11. By heating in this manner, as shown in FIG. 1C, the carbon dioxide is released from the absorption liquid 11. As described above, the step of heating the absorption liquid 11 to release the carbon dioxide from the absorption liquid 11 corresponds to a first release step. This heating is heating to the temperature lower than the temperature at which the sulfur compound absorbed by the absorption liquid 11 is released from the absorption liquid 11 as described above, whereby, as shown in FIG. 1C, the sulfur compound absorbed by the absorption liquid 11 remains absorbed by the absorption liquid 11. Even if the gas to be treated contains a gas other than carbon dioxide and a sulfur compound, the gas is not released in the first release step as long as the gas is not absorbed by the absorption liquid 11 in the absorption step. Therefore, in the first release step, the release of the gas and the sulfur compound that are less likely to be absorbed by the absorption liquid 11 is sufficiently suppressed. Therefore, the gas treatment method can recover high-concentration carbon dioxide.

In the gas treatment method, after the first release step, the absorption liquid 11 after the first release step may be heated to a temperature equal to or higher than a temperature at which the sulfur compound absorbed by the absorption liquid 11 is released from the absorption liquid 11. Consequently, as shown in FIG. 1D, the sulfur compound is also released from the absorption liquid 11. As described above, the step of heating the absorption liquid 11 to release the sulfur compound from the absorption liquid 11 corresponds to a second release step. According to such a gas treatment method, the carbon dioxide and the sulfur compound can be individually recovered.

The gas to be treated may be a gas containing carbon dioxide and a sulfur compound, and the treatment according to the gas treatment method using such a gas as the gas to be treated makes it possible to recover the high-concentration carbon dioxide as described above. The gas to be treated may contain a gas other than carbon dioxide and a sulfur compound, and examples of the gas other than carbon dioxide and a sulfur compound include a gas that is less likely to be absorbed by the absorption liquid 11, such as nitrogen. Specific examples of the gas to be treated include a power plant exhaust gas and a blast furnace by-product gas.

As described above, the absorption liquid is phase-separated by carbon dioxide absorption. The absorption liquid may be phase-separated by not only the carbon dioxide absorption but also sulfur compound absorption. Examples of the absorption liquid include an aqueous solution of an amine compound, and the aqueous solution of the amine compound may further contain an organic solvent. That is, examples of the absorption liquid include a basic liquid containing an amine compound, an organic solvent, and water.

As described above, the amine compound is not limited to the primary amine, and examples thereof include the secondary amine and the tertiary amine. Examples of the primary amine include 2-aminoethanol (MEA: solubility parameter=14.3 $(cal/cm^3)^{1/2}$), and 2-(2-aminoethoxy)ethanol (AEE: solubility parameter=12.7 $(cal/cm^3)^{1/2}$). Examples of the secondary amine include 2-(methylamino)ethanol (MAE), 2-(ethylamino)ethanol (EAE), and 2-(butylamino)ethanol (BAE). Examples of the tertiary amine include triethanolamine (TEA), N-methyldiethanolamine (MDEA), tetramethylethylene diamine (TEMED), pentamethyldiethylene triamine (PMDETA), hexamethyltriethylene tetramine, and bis(2-dimethylaminoethyl)ether. The amine compounds may be used alone or in combination of two or more.

Examples of the organic solvent include 1-butanol (solubility parameter=11.3 $(cal/cm^3)^{1/2}$), 1-pentanol (solubility parameter=11.0 $(cal/cm^3)^{1/2}$), octanol, diethylene glycol diethyl ether (DEGDEE), and diethylene glycol dimethyl ether (DEGDME). These organic solvents may be used alone or in combination of two or more.

The absorption liquid may contain an ionic liquid or the like in addition to the amine compound, the organic solvent, and water.

When the absorption liquid is a basic liquid containing an amine compound, an organic solvent, and water, the content rate of the amine compound is preferably 20 to 40% by mass. The content rate of the organic solvent is preferably 40 to 60% by mass. The absorption liquid preferably contains water. Examples of the absorption liquid include a liquid containing 30% by mass of the amine compound, 60% by mass of the organic solvent, and 10% by mass of water.

When the absorption liquid is a basic liquid containing the amine compound, the organic solvent, and water, the solubility parameter of the amine compound and the solubility parameter of the organic solvent preferably satisfy a relationship described later. The solubility parameter is determined by the following equation (1).

$$\delta=[(\Delta H-RT)/V]^{1/2} \qquad (1)$$

In the equation (1), $\delta$ represents a solubility parameter; $\Delta H$ represents molar evaporation latent heat; R represents a gas constant; T represents an absolute temperature; and V represents a molar volume.

The state of the absorption liquid after absorbing carbon dioxide when the absorption liquid is the basic liquid containing the amine compound, the organic solvent, and water will be described. As the absorption liquid, a liquid containing 30% by mass of the amine compound, 60% by mass of the organic solvent, and 10% by mass of water is used, and the state of the absorption liquid in each of the combinations of the kinds of the amine compound with the kinds of the organic solvent is observed. The results are shown in Table 1. Table 1 shows the solubility parameter of the amine compound, the solubility parameter of the organic solvent, a value obtained by subtracting the solubility parameter of the organic solvent from the solubility parameter of the amine compound, and the state of the absorption liquid after absorbing carbon dioxide. "Good" in Table 1 indicates that the absorption liquid is a single liquid phase before the carbon dioxide absorption, and is separated into two liquid phases by the carbon dioxide absorption. "Not miscible" in Table 1 indicates that the absorption liquid is a state of the two liquid phases and is not formed the single liquid phase before the carbon dioxide absorption. "Not separated" in Table 1 indicates that the absorption liquid is the single liquid phase even after the carbon dioxide absorption. The solubility parameter of the amine compound and the solubility parameter of the organic solvent shown in Table 1 are described only up to one decimal place in the relationship of significant digits, whereby a rounding error occurs in the value obtained by subtracting the solubility parameter of the organic solvent from the solubility parameter of the amine compound, which may not cause a difference between the solubility parameters shown in Table 1.

TABLE 1

| Difference between solubility parameters/ two-phase separation capacity | | | Organic solvent/ solubility parameter [$(cal/cm^3)^{1/2}$] | | |
|---|---|---|---|---|---|
| | | | 1-butanol 11.3 | 1-pentanol 11.0 | DEGDEE 8.2 |
| Amine compound/ solubility parameter [$(cal/cm^3)^{1/2}$] | MEA | 14.3 | 3.0 Good | 3.3 Good | 6.1 Not miscible |
| | AEE | 12.7 | 1.4 Good | 1.7 Good | 4.5 Not miscible |
| | MAE | 12.5 | 1.2 Good | 1.5 Good | 4.4 Not miscible |
| | EAE | 12.0 | 0.7 Not separated | | 3.8 Good |

As can be seen from Table 1, when the absorption liquid is a basic liquid containing an amine compound, an organic solvent, and water, the value obtained by subtracting the solubility parameter of the organic solvent from the solubility parameter of the amine compound (difference between solubility parameters) is preferably 1.1 $(cal/cm^3)^{1/2}$ or more and 4.2 $(cal/cm^3)^{1/2}$ or less. By selecting the amine compound and the organic solvent so that this value falls within the above range, the absorption liquid can absorb the carbon dioxide. The absorption liquid is in a one-phase state before the carbon dioxide absorption, but is in a two-phase state after the carbon dioxide absorption. That is, the absorption liquid is phase-separated by the carbon dioxide absorption. When the difference between solubility parameters is too small, the obtained liquid tends not to be phase-separated even if the carbon dioxide is absorbed by the obtained liquid.

When the difference between solubility parameters is too large, the obtained liquid tends to be in a two-phase state before absorbing the carbon dioxide. This two-phase state causes insufficient mixing of the organic solvent with water, and the amount of the amine compound contained in any phase, for example, an aqueous phase is larger. Even if the gas to be treated is brought into contact with the liquid in such a state, a contact state between the liquid and the gas to be treated becomes ununiform, which may cause reduced absorption efficiency.

In the absorption liquid, a minimum temperature (sulfur compound releasable temperature) at which the sulfur compound absorbed by the absorption liquid is released from the absorption liquid is higher than a minimum temperature ($CO_2$ releasable temperature) at which the carbon dioxide absorbed by the absorption liquid is released from the absorption liquid. In the absorption liquid, a maximum temperature (absorbable temperature) at which the carbon dioxide and the sulfur compound are absorbed by the absorption liquid is lower than the $CO_2$ releasable temperature.

For example, when an absorption liquid containing 30% by mass of EAE as the amine compound, 60% by mass of DEGDEE as the organic solvent, and 10% by mass of water is used, and a gas containing carbon dioxide ($CO_2$) and sulfur oxide ($SO_x$) as the sulfur compound is used as the gas to be treated, the absorbable temperature, the $CO_2$ releasable temperature, and the sulfur compound releasable temperature are assumed to be respectively about 60° C., about 70° C., and about 120° C. These temperatures are values assumed at a low pressure close to the atmospheric pressure, and the temperatures increase as the pressure increases. At this time, if the temperature is 60° C. or lower, for example, 0 to 60° C. in a state where the absorption liquid and the gas to be treated coexist, the carbon dioxide and the sulfur oxide are absorbed by the absorption liquid. That is, the temperature of the absorption liquid in the absorption step is preferably 0 to 60° C. If the absorption liquid by which the carbon dioxide and the sulfur oxide are absorbed is heated to 70° C. or higher, the carbon dioxide is released, and if the absorption liquid is heated to 120° C. or higher, the sulfur oxide is also released. For this reason, the temperature of the absorption liquid in the first release step is preferably 70° C. or higher and lower than 120° C., and the temperature of the absorption liquid in the second release step is preferably 120° C. or higher.

As described above, the absorption liquid 11 may be phase-separated by not only the carbon dioxide absorption but also the sulfur compound absorption. In this case, as shown in FIG. 1B, the absorption liquid 11 is phase-separated into the first phase portion 12 having a relatively high content rate of the carbon dioxide and the sulfur compound and the second phase portion 13 having a relatively low content rate of the carbon dioxide and the sulfur compound by the carbon dioxide absorption and the sulfur compound absorption.

In the second release step, as described above, the absorption liquid after the carbon dioxide is released from the absorption liquid in the first release step may be heated. In the second release step, the entire absorption liquid may be heated, but it is preferable to heat the first phase portion after the carbon dioxide is released from the absorption liquid in the first release step. Examples of the step include a method in which the carbon dioxide is released from the absorption liquid in the first release step, and the first phase portion 12 is then preferentially heated as shown in FIG. 1C to release the sulfur compound from the absorption liquid 11 as shown in FIG. 1D. Examples of a method other than this method (other method) include a method in which the carbon dioxide is released from the absorption liquid in the first release step, and at least a part of the first phase portion 12 is then taken out as shown in FIG. IC, followed by heating the taken-out first phase portion 12 to release the sulfur compound from the first phase portion 12. As described above, in the second release step, the sulfur compound is released from the absorption liquid by heating the first phase portion having a relatively high content rate of the sulfur compound, whereby the sulfur compound can be efficiently released from the absorption liquid.

The gas treatment method may further include a first recovery step of releasing the carbon dioxide from the absorption liquid in the first release step, and then adsorbing and recovering the sulfur compound from the absorption liquid after the first release step.

The first recovery step is not particularly limited as long as the sulfur compound can be adsorbed and recovered from the absorption liquid after the first release step. Examples of the first recovery step include a step of causing the absorption liquid after the first release step to pass through a recovery device storing an adsorbent capable of adsorbing the sulfur compound. In this step, the absorption liquid after the first release step passes through the recovery device while being brought into contact with the adsorbent stored in the recovery device, whereby the sulfur compound contained in the absorption liquid after the first release step is adsorbed by the adsorbent. The sulfur compound is recovered from the absorption liquid after the first release step by recovering the adsorbent by which the sulfur compound is adsorbed. The recovery device used in the first recovery step is also referred to as a first recovery device.

The recovery device is not particularly limited as long as the sulfur compound can be adsorbed and recovered from the absorption liquid. The recovery device includes, for example, a container in which the absorption liquid can flow, and an adsorbent stored in the container. The recovery device may be horizontally placed such that a longitudinal direction of the recovery device is a horizontal direction, or vertically placed such that the longitudinal direction of the recovery device is a vertical direction, and the placement direction is not particularly limited.

The adsorbent is not particularly limited as long as the adsorbent can adsorb the sulfur compound from the absorption liquid when the adsorbent is brought into contact with the absorption liquid. Examples of the adsorbent include a metal adsorbent, a resin adsorbent, an inorganic adsorbent, and a physical adsorbent. As the adsorbent, in addition to these, any adsorbent used for desulfurization, for example, an adsorbent for desulfurization can be used. Examples of the metal adsorbent include a Ca-based adsorbent, an Mg-based adsorbent, a Zn-based adsorbent, an Fe-based adsorbent, and a Ba-based adsorbent. The form of the metal adsorbent may be, for example, a single metal, a carbonate, a hydroxide, and an oxide and the like. Examples of the resin adsorbent include an ion exchange resin. Examples of the inorganic adsorbent include zeolite and silica gel. Examples of the physical adsorbent include activated carbon. The adsorbents may be used alone or in combination of two or more.

The gas treatment method further includes the first recovery step, whereby the gas treatment method can adsorb and recover the sulfur compound from the absorption liquid after the first release step, that is, the absorption liquid after the carbon dioxide is released, in the first recovery step. For this reason, such a gas treatment method can not only recover high-concentration carbon dioxide but also remove the sulfur compound from the absorption liquid after the recovery of the carbon dioxide. That is, such a gas treatment method can not only recover the high-concentration carbon dioxide but also suppress the accumulation of the sulfur compound contained in the absorption liquid.

In the second release step, all of the sulfur compound may not be released from the absorption liquid after the first release step. In such a case, in the gas treatment method, by separately performing a treatment of removing the sulfur compound from the absorption liquid after the second release step, the accumulation of the sulfur compound contained in the absorption liquid in the apparatus for performing the gas treatment method can be further suppressed by, for example, the following configuration. Specifically, the gas treatment method may further include a second recovery step of releasing the sulfur compound from the absorption liquid in the second release step, and then adsorbing and recovering the sulfur compound not released in the second release step from the absorption liquid after the second release step.

The second recovery step is not particularly limited as long as the sulfur compound not released in the second release step can be adsorbed and recovered from the absorption liquid after the second release step. The second recovery step is similar to the first recovery step except that the absorption liquid after the second release step is used instead of the absorption liquid after the first release step. The recovery device used in the second recovery step is also referred to as a second recovery device. The second recovery device is not particularly limited as long as the sulfur compound can be recovered from the absorption liquid after the second release step, and examples thereof include those similar to the first recovery device.

The gas treatment method further includes the second recovery step, whereby the gas treatment method can adsorb and recover the sulfur compound not released in the second release step from the absorption liquid after the second release step, that is, the absorption liquid after releasing the sulfur compound, in the second recovery step. For this reason, such a gas treatment method can not only recover high-concentration carbon dioxide but also remove the sulfur compound from the absorption liquid after the recovery of the carbon dioxide. That is, such a gas treatment method can not only recover the high-concentration carbon dioxide but also suppress the accumulation of the sulfur compound contained in the absorption liquid.

The reason why the gas treatment method includes the second recovery step is that the sulfur compound can be further removed from the absorption liquid after recovering the carbon dioxide as described above. More specifically, the cost required in the removal of the sulfur compound from the absorption liquid in the second release step tends to be lower than that in the second recovery step. Therefore, removing the sulfur compound remaining in the absorption liquid in the second recovery step after removing the sulfur compound from the absorption liquid in the second release step is advantageous not only in that the sulfur compound can be further removed from the absorption liquid but also in terms of cost. When the sulfur compound contained in the absorption liquid is removed in advance in the first recovery step before the sulfur compound is removed from the absorption liquid in the second release step, the amount of the sulfur compound contained in the absorption liquid to be subjected to the second release step is reduced, whereby the sulfur compound can be further removed from the absorption liquid.

The gas treatment method may include neither the first recovery step nor the second recovery step, and may include any one or both of the first recovery step and the second recovery step. When the gas treatment method includes both the first recovery step and the second recovery step, the sulfur compound can be further removed from the absorption liquid. In the first recovery step and the second recovery step, a degraded product of an absorption liquid component such as an amine contained in the absorption liquid, or metal ions formed as a result of corrosion, or the like may be removed depending on the adsorbent to be used. Specifically, when an adsorbent capable of adsorbing not only the sulfur compound from the absorption liquid but also the degraded product of the absorption liquid component is used as the adsorbent, not only the sulfur compound but also the degraded product of the absorption liquid component can be removed from the absorption liquid.

The gas treatment method may further include a circulation step of circulating an absorption liquid. Examples of the circulation step include a discarding step of discarding at least a part of the first phase portion after the first release step, and a reuse step of using the absorption liquid other than the discarded first phase portion as an absorption liquid to be brought into contact with the gas to be treated in the absorption step. In the discarding step, the sulfur compound can be efficiently discarded by discarding at least a part of the first phase portion having a relatively high content rate of the sulfur compound.

As described above, the sulfur compound promotes an irreversible deterioration reaction of a component contained in the absorption liquid, for example, an amine. That is, the sulfur compound deteriorates the component contained in the absorption liquid, and generates a degraded product of the absorption liquid component, for example, a degraded product of an amine. Therefore, when the absorption liquid is used for the recovery of the carbon dioxide for a long period of time by the use of the absorption liquid after releasing the carbon dioxide again in the absorption step, or the like, the amount of the degraded product of the absorption liquid component generated in the absorption liquid increases. When the absorption liquid is used for a long period of time to recover the carbon dioxide, not only the amount of the degraded product of the absorption liquid component increases, but also acids such as glycolic acid, oxalic acid, and formic acid are generated. The amounts of the degraded product of the absorption liquid component and the acid are desirably small because the degraded product and the acid cannot absorb the carbon dioxide, that is, do not act on the recovery of the carbon dioxide. For this reason, at least a part of the used absorption liquid is discarded and replaced with a new absorption liquid.

The absorption liquid is phase-separated into the first phase portion having a relatively high content rate of the carbon dioxide and the sulfur compound and the second phase portion having a relatively low content rate of the carbon dioxide and the sulfur compound as described above by the absorption of the carbon dioxide and the sulfur oxide. In the first phase portion, not only the content of the carbon dioxide and the sulfur compound but also the content of the degraded product of the absorption liquid component and the acid is relatively high. This is considered to be because the first phase portion is an aqueous phase, and the amine is dissolved in the water, whereby the first phase portion is an amine-rich amine phase, and the second phase portion is an organic solvent-rich organic phase. As a result, the first phase portion has a relatively high polarity. Many of the degraded products of the absorption liquid components and the acids also have a polarity in the molecule, whereby they are considered to be preferentially present in the first phase portion having a relatively high polarity. Therefore, as the discard, by discarding the first phase portion having a relatively high content rate of the sulfur compound, not only the sulfur compound can be efficiently discarded, but also the degraded product can be efficiently discarded.

Examples of the reuse step include a method in which the absorption liquid other than the first phase portion discarded in the discarding step is charged into the absorption liquid shown in FIG. 1A. The absorption liquid other than the discarded first phase portion contains the second phase portion and the first phase portion that has not been discarded. Examples of a method other than this method (other method) include a method in which at least a part of the first phase portion is discarded after the first release step, and the absorption liquid after the absorption liquid other than the discarded first phase portion which is subjected to the second release step is charged into the absorption liquid shown in FIG. 1A.

By providing the circulation step as described above, the absorption liquid other than the discarded first phase portion can be used as the absorption liquid to be brought into contact with the gas to be treated in the absorption step, and the carbon dioxide can be recovered by using the absorption liquid having a relatively low content rate of the sulfur compound and the degraded product. The absorption liquid after releasing the carbon dioxide is used again in the absorption step, whereby the amounts of the sulfur compound and the degraded product remaining in the absorption liquid can be kept low even if the absorption liquid is used for the recovery of the carbon dioxide for a long period of time. This makes it possible to reduce the exchange frequency of the absorption liquid, and to reduce the amount of a new absorption liquid added. Therefore, the amount of the absorption liquid used can be reduced. Specifically, when the absorption liquid is used for the recovery of the carbon dioxide over a long period of time, the first phase portion having a relatively high content rate of the sulfur compound is discarded, and a new absorption liquid is added in an amount corresponding to the discarded amount, whereby the amount of the absorption liquid used can be reduced.

The apparatus for performing the gas treatment method is not particularly limited as long as the absorption step and the first release step can be performed, and examples thereof include a gas treatment apparatus including: an absorption device that brings a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release device that heats the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid. Such a gas treatment apparatus performs the absorption step in the absorption device and the first release step in the first release device, whereby the gas treatment apparatus can recover high-concentration carbon dioxide from the gas to be treated, which contains carbon dioxide and a sulfur compound.

Figure 2:
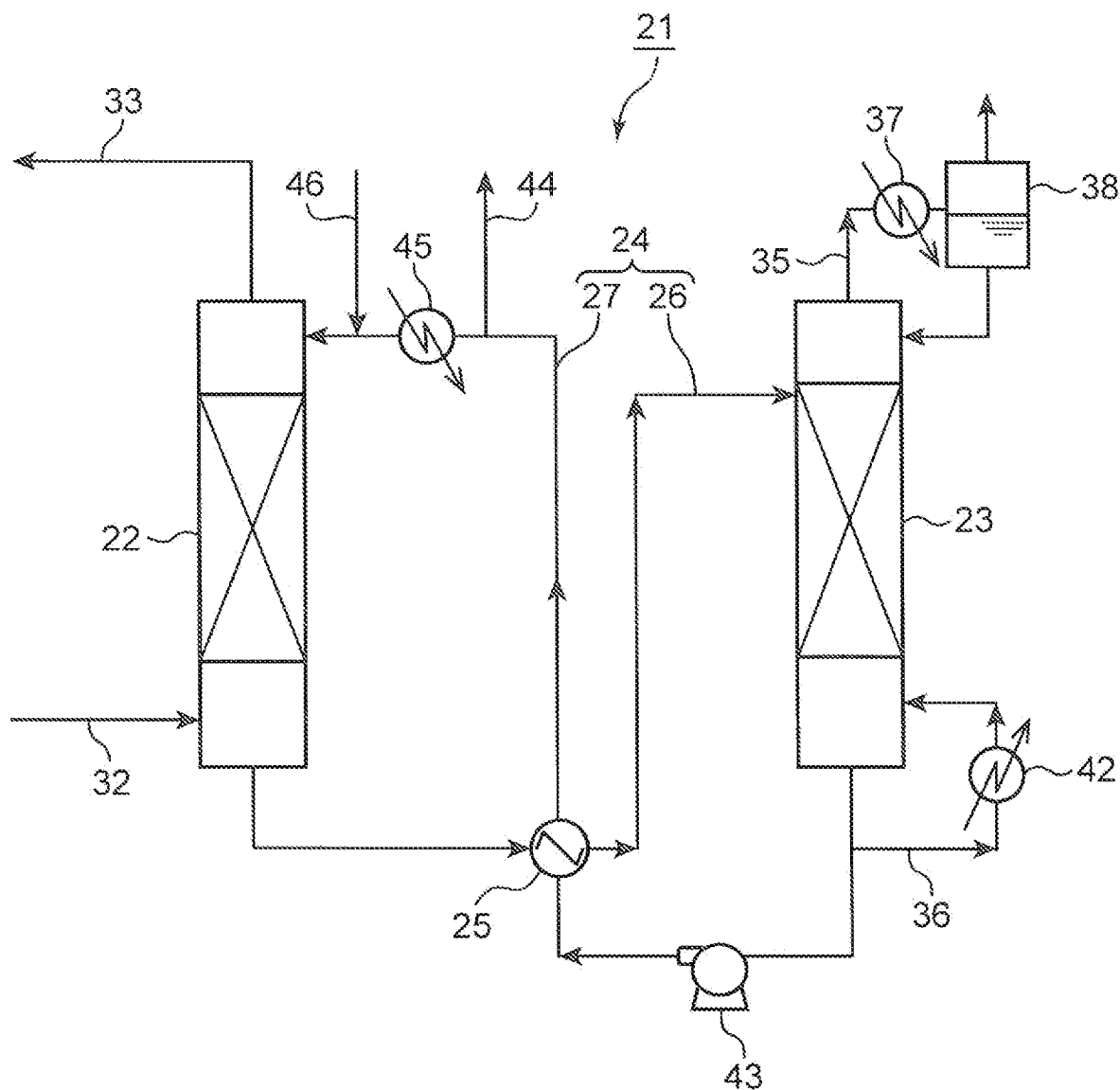
FIG. 2 is a schematic view showing an example of a gas treatment apparatus according to the embodiment of the present invention.

The gas treatment apparatus is used to recover the high-concentration carbon dioxide from the gas to be treated, which contains carbon dioxide and a sulfur compound, using the absorption liquid. As shown in FIG. 2, specific examples of the gas treatment apparatus 21 include an apparatus including an absorption device 22, a first release device 23, a circulation channel 24, and a heat exchanger 25. FIG. 2 is a schematic view showing an example of a gas treatment apparatus according to the present embodiment.

The circulation channel 24 includes a first flow channel 26 that extracts an absorption liquid from the absorption device 22 and introduces the absorption liquid into the first release device 23, and a second flow channel 27 that extracts the absorption liquid from the first release device 23 and returns the absorption liquid to the absorption device 22. The heat exchanger 25 can be omitted.

Connected to the absorption device 22 are a gas supply channel 32 that supplies a gas to be treated, a gas discharge channel 33 that discharges the gas after being treated in the absorption device 22, the first flow channel 26 for sending an absorption liquid to the first release device 23, and the second flow channel 27 for returning the absorption liquid from the first release device 23 to the absorption device 22. The gas supply channel 32 can supply the gas to be treated into the absorption device 22. The gas discharge channel 33 can discharge a gas that has not been absorbed even when the gas to be treated is brought into contact with the absorption liquid from the inside of the absorption device 22. The first flow channel 26 can extract the absorption liquid accumulated in the absorption device 22. The second flow channel 27 can cause the absorption liquid returned from the first release device 23 to flow down from upward.

The gas to be treated and the absorption liquid are brought into contact with each other, whereby the absorption device 22 causes the absorption liquid to absorb an acidic compound such as carbon dioxide and a sulfur compound in the gas to be treated, and discharges the gas from which the acidic compound has been removed. Such an absorption device 22 only needs to be configured to allow the gas to be treated and the absorption liquid to be continuously brought into contact with each other. Examples of the absorption device 22 that can be used include an absorber that sprays an absorption liquid to a flow channel of a gas to be treated, an absorber that causes an absorption liquid to flow down along a filler disposed in a flow channel of a gas to be treated, and an absorber that introduces a gas to be treated and an absorption liquid into a large number of fine flow channels and combines fine flow channels for the gas to be treated and fine flow channels for the absorption liquid. The absorption of the carbon dioxide and the sulfur compound into the absorption liquid is an exothermic reaction.

The first flow channel 26 and the second flow channel 27 are connected to the first release device 23. The first flow channel 26 can introduce the absorption liquid led out of the absorption device 22 into the first release device 23. The second flow channel 27 can lead out the absorption liquid stored in the first release device 23.

The first release device 23 stores an absorption liquid, and heats the stored absorption liquid to a temperature equal to or higher than the $CO_2$ releasable temperature and lower than the sulfur compound releasable temperature to release the carbon dioxide. The release of the carbon dioxide from the absorption liquid, that is, the desorption of the carbon dioxide from the component contained in the absorption liquid is an endothermic reaction. When the absorption liquid is heated as described above in the first release device 23, not only the carbon dioxide is released but also water contained in the absorption liquid is evaporated. That is, in the first release device 23, the carbon dioxide and water vapor are released from the absorption liquid.

A supply channel 35 and a heating flow channel 36 are connected to the first release device 23.

The supply channel 35 supplies the carbon dioxide obtained in the first release device 23 to a supply destination. The supply channel 35 includes a cooler 37 and a carbon dioxide separation device 38. The cooler 37 cools a mixed gas of the carbon dioxide and water vapor released from the absorption liquid to condense the water vapor. The carbon dioxide separation device 38 separates water condensed by the cooler 37 from the carbon dioxide. The separated water vapor is returned to the first release device 23. As the cooler 37, a heat exchanger using inexpensive cooling water such as river water can be used. The cooler 37 and the carbon dioxide separation device 38 can be omitted.

One end portion of the heating flow channel 36 is connected to the second flow channel 27, but may be connected to the first release device 23. The other end portion of the heating flow channel 36 is connected to the first release device 23. The heating flow channel 36 includes a heater 42 that heats the absorption liquid stored in the first release device 23. The heater 42 may be disposed to heat the absorption liquid in the first release device 23, but may be configured to heat the absorption liquid extracted from the first release device 23 to the outside as shown in the drawing. In this case, the heater 42 can be disposed in the heating flow channel 36 for returning the absorption liquid to the first release device 23 after heating. As the heater 42, for example, heaters that directly or indirectly heat the absorption liquid by any heat source such as electricity, vapor, or a burner can be used.

The heat exchanger 25 is connected to the first flow channel 26 and the second flow channel 27, to provide heat exchange between the absorption liquid flowing through the first flow channel 26 and the absorption liquid flowing through the second flow channel 27. The heat exchanger 25 is configured by, for example, a plate heat exchanger or the like, but may be configured by a microchannel heat exchanger capable of providing heat exchange between fluids having a relatively small temperature difference. This can provide improved energy efficiency.

The second flow channel 27 includes a pump 43. The second flow channel 27 includes an absorption liquid discharge channel 44, a cooler 45, and an absorption liquid supply channel 46. The absorption liquid discharge channel 44 discharges the absorption liquid from the gas treatment apparatus 21 when exchanging the absorption liquid, for example. The cooler 45 cools the absorption liquid returned to the absorption device 22. The absorption liquid supply channel 46 supplies the absorption liquid to the second flow channel 27 when exchanging the absorption liquid, for example. The cooler 45 can be omitted.

The gas treatment apparatus 21 performs the absorption step in the absorption device 22 and the first release step in the first release device 23, whereby the gas treatment apparatus 21 can recover high-concentration carbon dioxide from the gas to be treated, which contains carbon dioxide and a sulfur compound. The gas treatment apparatus 21 circulates the absorption liquid in the circulation channel 24, whereby the gas treatment apparatus 21 can use the absorption liquid for a long period of time to recover the carbon dioxide.

Figure 3:
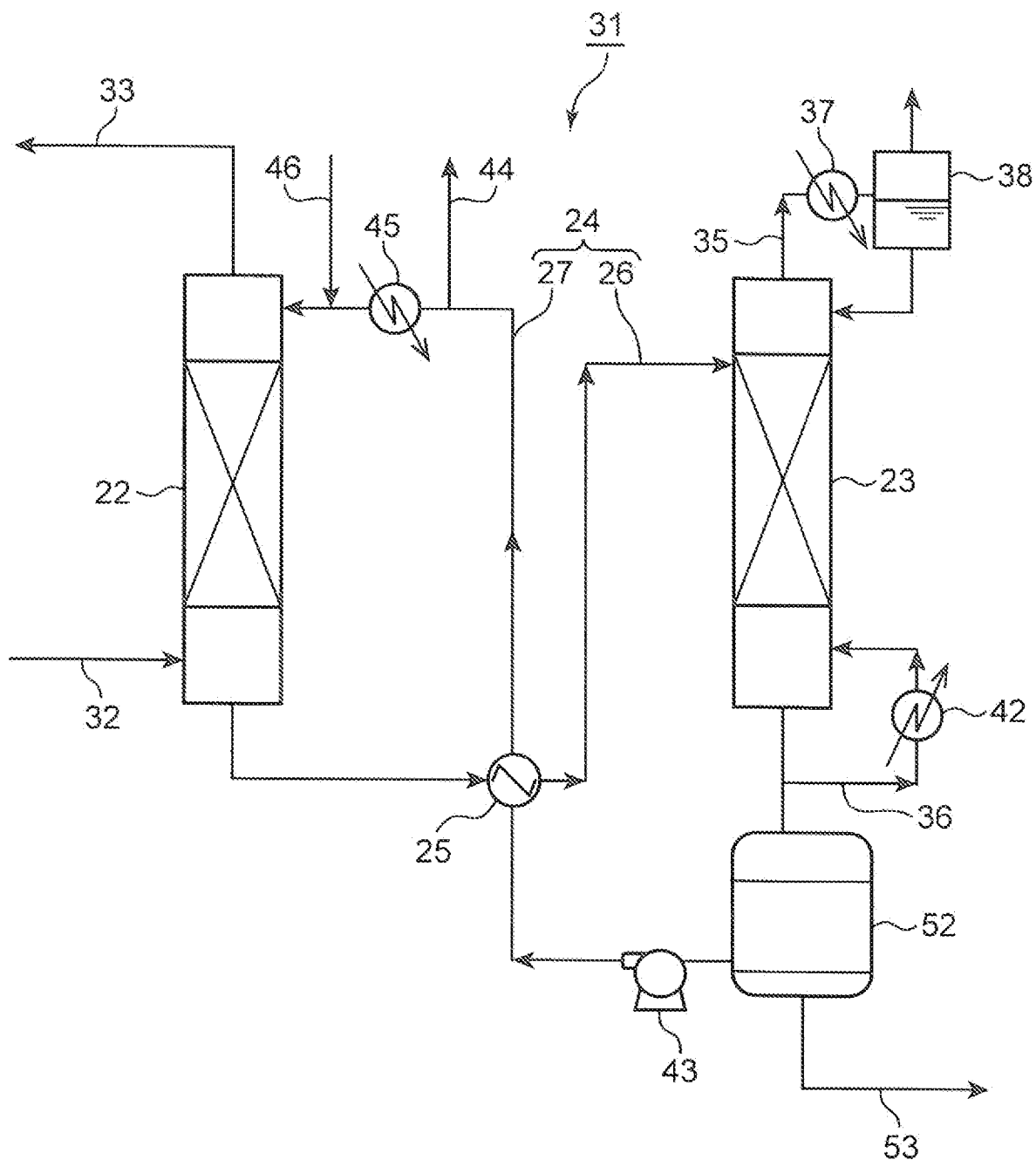
FIG. 3 is a schematic view showing another example of the gas treatment apparatus according to the embodiment of the present invention.

Examples of another apparatus that performs the gas treatment method include a gas treatment apparatus 31 that is similar to the gas treatment apparatus 21 except that at least a part of the first phase portion is separated from the absorption liquid led out of the first release device 23, as shown in FIG. 3. That is, examples thereof include a gas treatment apparatus 31 that is similar to the gas treatment apparatus 21 except that the gas treatment apparatus further includes a circulation mechanism that discards at least a part of the first phase portion after the carbon dioxide is released from the absorption liquid by the first release device 23, and uses the absorption liquid other than the discarded first phase portion as the absorption liquid to be brought into contact with the gas to be treated in the absorption device 22.

In the gas treatment apparatus 31, specifically, the second flow channel includes a phase separator 52. The phase separator 52 separates at least a part of the first phase portion of the absorption liquid led out of the first release device 23. The phase separator 52 includes a lead-out channel 53. The lead-out channel 53 leads out the first phase portion separated by the phase separator 52. The led-out first phase portion may be discarded, or may be supplied to another device as described later, for example, a second release device or the like to be described later. The absorption liquid other than the first phase portion separated by the phase separator 52 and led out to the lead-out channel 53 is returned to the absorption device 22 via the second flow channel 27. The phase separator 52 is not particularly limited as long as at least a part of the first phase portion can be extracted from the absorption liquid phase-separated into the first phase portion and the second phase portion by the absorption of the sulfur compound, and examples thereof include a container to which the lead-out channel 53 is connected such that only a lower layer is led out since the first phase portion is the lower layer. FIG. 3 is a schematic view showing another example of the gas treatment apparatus 31 according to the present embodiment.

The gas treatment apparatus 31 can perform the absorption step in the absorption device 22, the first release step in the first release device 23, and further the circulation step in the phase separator 52 and the circulation channel 24. Therefore, the gas treatment apparatus 31 can not only recover high-concentration carbon dioxide from the gas to be treated, but also efficiently discard the sulfur compound, the degraded product, and the acid. Even when the absorption liquid is used for a long period of time to recover the carbon dioxide, the contents of the degraded product and the acid can be kept low. Therefore, the exchange frequency of the absorption liquid can be reduced, and the amount of an absorption liquid newly supplied can be reduced.

Figure 4:
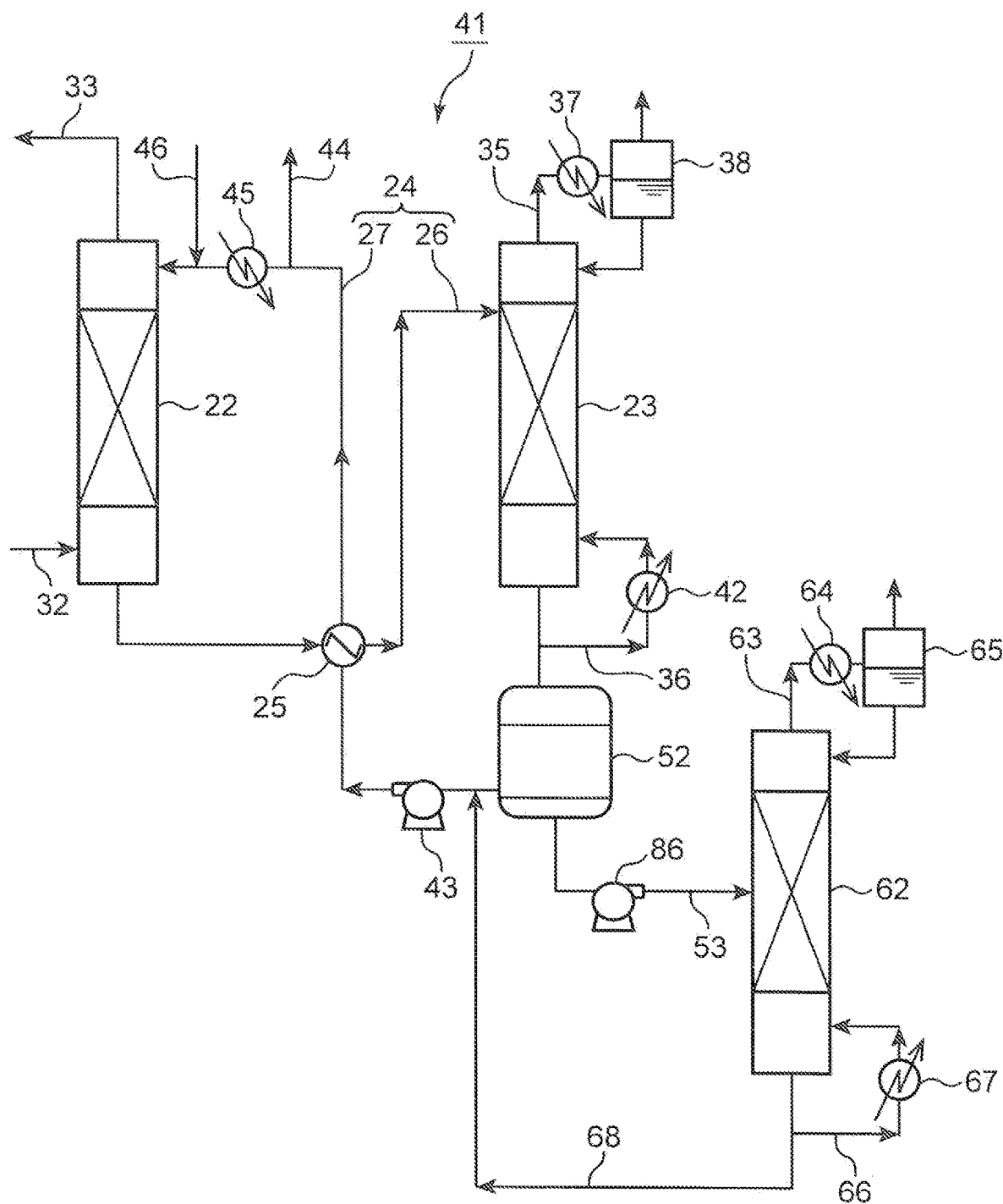
FIG. 4 is a schematic view showing another example of the gas treatment apparatus according to the embodiment of the present invention.

Examples of another apparatus that performs the gas treatment method include a gas treatment apparatus 41 that is similar to the gas treatment apparatus 31 except that the gas treatment apparatus 41 includes a second release device 62 for heating an absorption liquid after the carbon dioxide is released by the first release device 23 to a temperature equal to or higher than the sulfur compound releasable temperature, as shown in FIG. 4. FIG. 4 is a schematic view showing another example of the gas treatment apparatus 41 according to the present embodiment.

In the gas treatment apparatus 41, specifically, the lead-out channel 53 includes the second release device 62. The lead-out channel 53 and a third flow channel 68 are connected to the second release device 62. The lead-out channel 53 can introduce the absorption liquid led out of the phase separator 52 into the second release device 62. The lead-out channel 53 includes a pump 86. The third flow channel 68 can lead out the absorption liquid stored in the second release device 62. The third flow channel 68 may also include a pump. The third flow channel 68 supplies the absorption liquid led out of the second release device 62 to the second flow channel 27. The third flow channel 68 may include a cooler.

The second release device 62 stores the absorption liquid, and heats the stored absorption liquid to a temperature equal to or higher than the sulfur compound releasable temperature to release the sulfur compound. The release of the sulfur compound from the absorption liquid, that is, the desorption of the sulfur compound from the component contained in the absorption liquid is an endothermic reaction. When the absorption liquid is heated as described above in the second release device 62, not only the sulfur compound is released but also water contained in the absorption liquid is evaporated. That is, in the second release device 62, the sulfur compound and water vapor are released from the absorption liquid.

A release channel 63 and a heating flow channel 66 are connected to the second release device 62.

The release channel 63 releases the sulfur compound generated from the absorption liquid in the second release device 62 and sends the sulfur compound to a recovery device or the like. The release channel 63 includes a cooler 64 and a sulfur compound separation device 65. The cooler 64 cools a mixed gas of the sulfur compound and water vapor released from the absorption liquid to condense the water vapor. The sulfur compound separation device 65 separates the water condensed by the cooler 64 and the sulfur compound from each other. The separated water vapor is returned to the second release device 62. As the cooler 64, a heat exchanger using inexpensive cooling water such as river water can be used. The cooler 64 and the sulfur compound separation device 65 can be omitted.

One end portion of the heating flow channel 66 is connected to the third flow channel 68, but may be connected to the second release device 62. The other end portion of the heating flow channel 66 is connected to the second release device 62. The heating flow channel 66 includes a heater 67 that heats the absorption liquid stored in the second release device 62. The heater 67 may be disposed to heat the absorption liquid in the second release device 62, but may be configured to heat the absorption liquid extracted from the second release device 62 to the outside as shown in the drawing. In this case, the heater 67 can be disposed in the heating flow channel 66 for returning the absorption liquid to the second release device 62 after heating. As the heater 67, for example, heaters that directly or indirectly heat the absorption liquid by any heat source such as electricity, vapor, or a burner can be used.

The gas treatment apparatus 41 can perform the absorption step in the absorption device 22, the first release step in the first release device 23, and further the second release step in the second release device 62. Therefore, the gas treatment apparatus 41 can individually recover the carbon dioxide and the sulfur compound from the gas to be treated.

Figure 5:
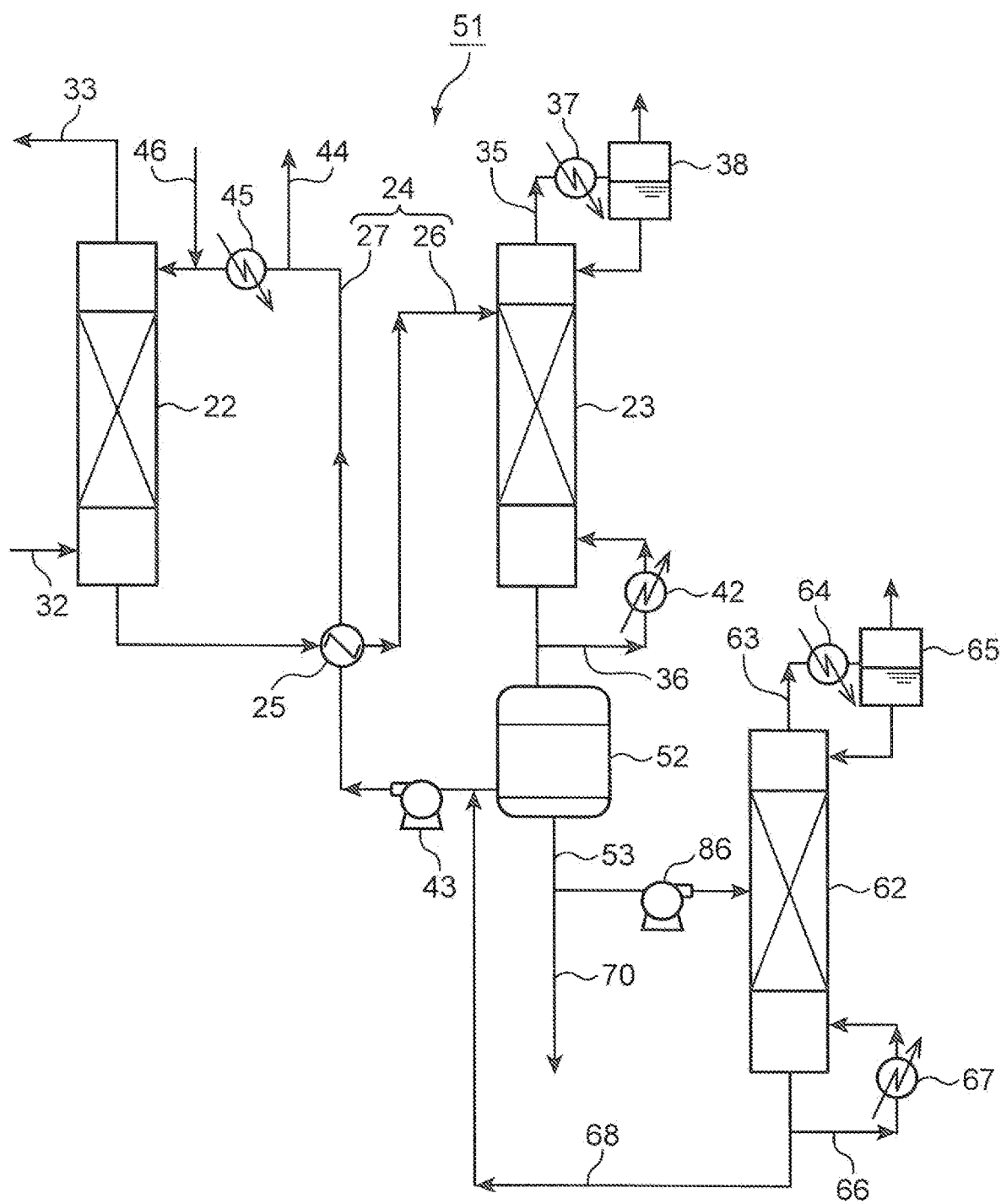
FIG. 5 is a schematic view showing another example of the gas treatment apparatus according to the embodiment of the present invention.

Examples of another apparatus that performs the gas treatment method include a gas treatment apparatus 51 that is similar to the gas treatment apparatus 41 except that the lead-out channel 53 includes not only the second release device 62 but also an absorption liquid discharge channel 70 as shown in FIG. 5. FIG. 5 is a schematic view showing another example of the gas treatment apparatus 51 according to the present embodiment.

The gas treatment apparatus 51 includes an absorption liquid discharge channel 70 for discarding at least a part of the first phase portion of the absorption liquid led out of the phase separator 52 in the lead-out channel 53. The absorption liquid that has not been discarded in the absorption liquid discharge channel 70 is sent to the second release device 62.

The gas treatment apparatus 51 can perform the absorption step in the absorption device 22, the first release step in the first release device 23, the second release step in the second release device 62, and further the circulation step in the phase separator 52, the circulation channel 24, and the third flow channel 68. Therefore, the gas treatment apparatus 51 can individually recover the carbon dioxide and the sulfur compound from the gas to be treated. Furthermore, even when the absorption liquid is used for a long period of time to recover the carbon dioxide and the sulfur compound, the exchange frequency of the absorption liquid can be reduced, and the amount of an absorption liquid newly supplied can be reduced.

Figure 6:
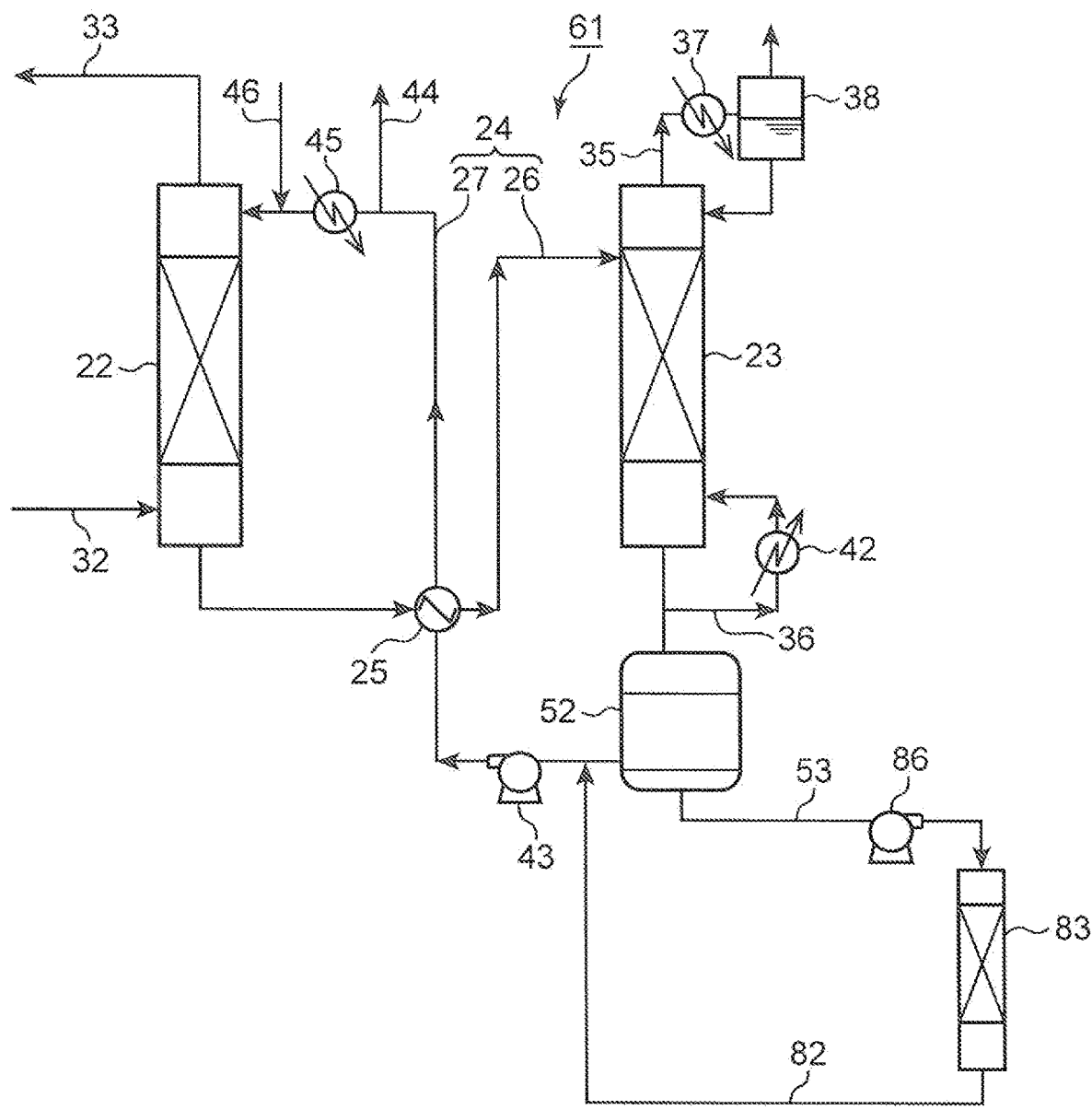
FIG. 6 is a schematic view showing another example of the gas treatment apparatus according to the embodiment of the present invention.

Examples of another apparatus that performs the gas treatment method include a gas treatment apparatus 61 that is similar to the gas treatment apparatus 31 except that the gas treatment apparatus 61 includes a first recovery device 83 that adsorbs and recovers the sulfur compound from the absorption liquid after the carbon dioxide is released by the first release device 23, as shown in FIG. 6. FIG. 6 is a schematic view showing another example of the gas treatment apparatus 61 according to the present embodiment.

In the gas treatment apparatus 61, specifically, the lead-out channel 53 includes the first recovery device 83. The lead-out channel 53 and a fourth flow channel 82 are connected to the first recovery device 83. The lead-out channel 53 includes a pump 86. The lead-out channel 53 can introduce the absorption liquid led out of the phase separator 52 into the first recovery device 83. The fourth flow channel 82 can supply the absorption liquid having passed through the first recovery device 83 to the second flow channel 27.

The first recovery device 83 is the first recovery device used in the first recovery step described above, and is a recovery device that adsorbs and recovers the sulfur compound from the absorption liquid led out of the first release device 23. In the gas treatment apparatus 61, the first recovery device 83 is vertically placed.

The gas treatment apparatus 61 can perform the absorption step in the absorption device 22, the first release step in the first release device 23, and further the first recovery step in the first recovery device 83. Therefore, the gas treatment apparatus 61 can individually recover the carbon dioxide and the sulfur compound from the gas to be treated.

The first recovery device 83 may be the first recovery device vertically placed as described above, or may be the first recovery device horizontally placed as described later.

Figure 7:
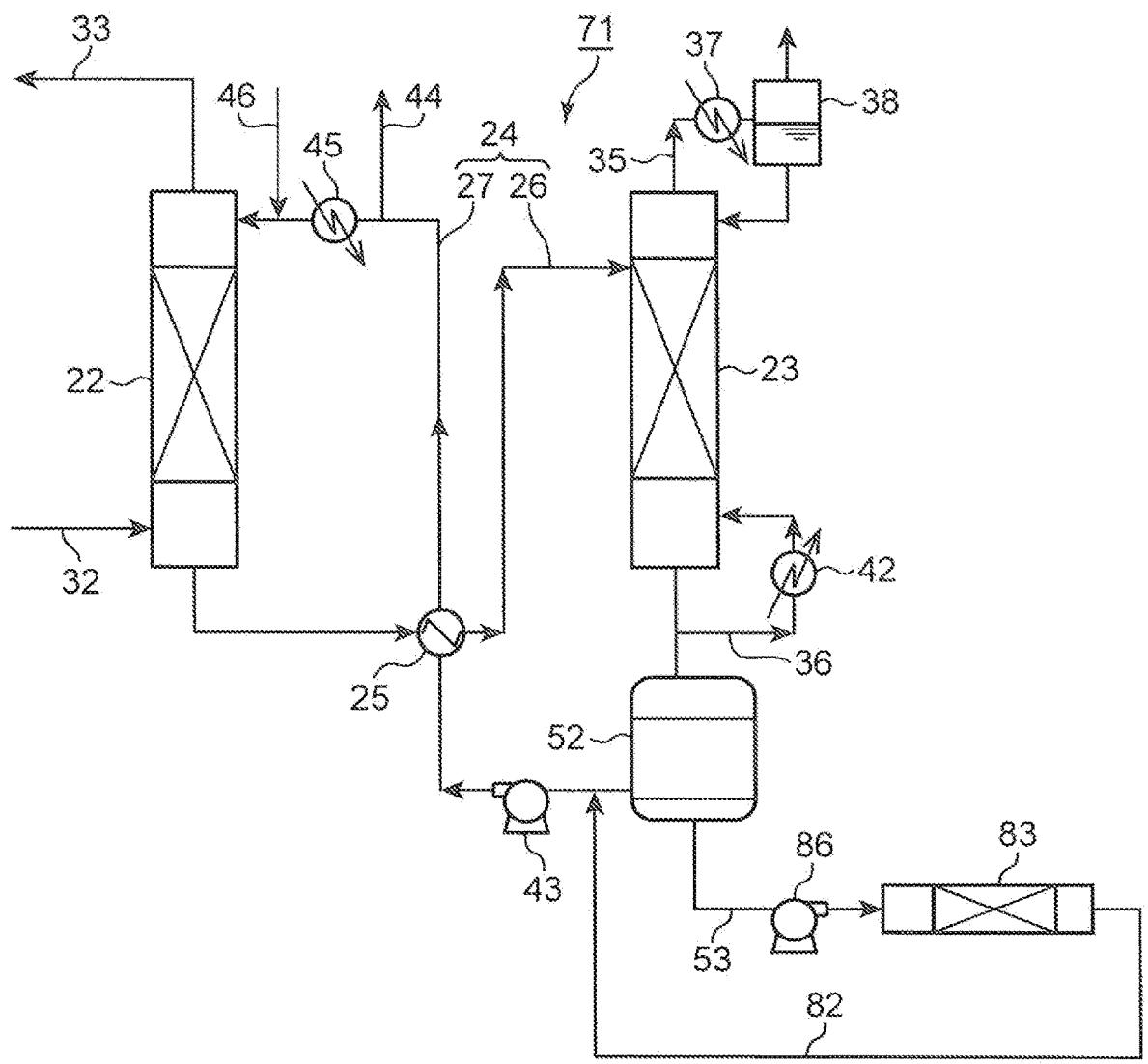
FIG. 7 is a schematic view showing another example of the gas treatment apparatus according to the embodiment of the present invention.

Examples of another apparatus that performs the gas treatment method include a gas treatment apparatus 71 that is similar to the gas treatment apparatus 61 except that the gas treatment apparatus 71 includes, as the first recovery device, the first recovery device 83 placed horizontally instead of the first recovery device 83 placed vertically, as shown in FIG. 7. FIG. 7 is a schematic view showing another example of the gas treatment apparatus 71 according to the present embodiment.

The gas treatment apparatus 71 can perform the absorption step in the absorption device 22, the first release step in the first release device 23, and further the first recovery step in the first recovery device 83. Therefore, the gas treatment apparatus 71 can individually recover the carbon dioxide and the sulfur compound from the gas to be treated.

Figure 8:
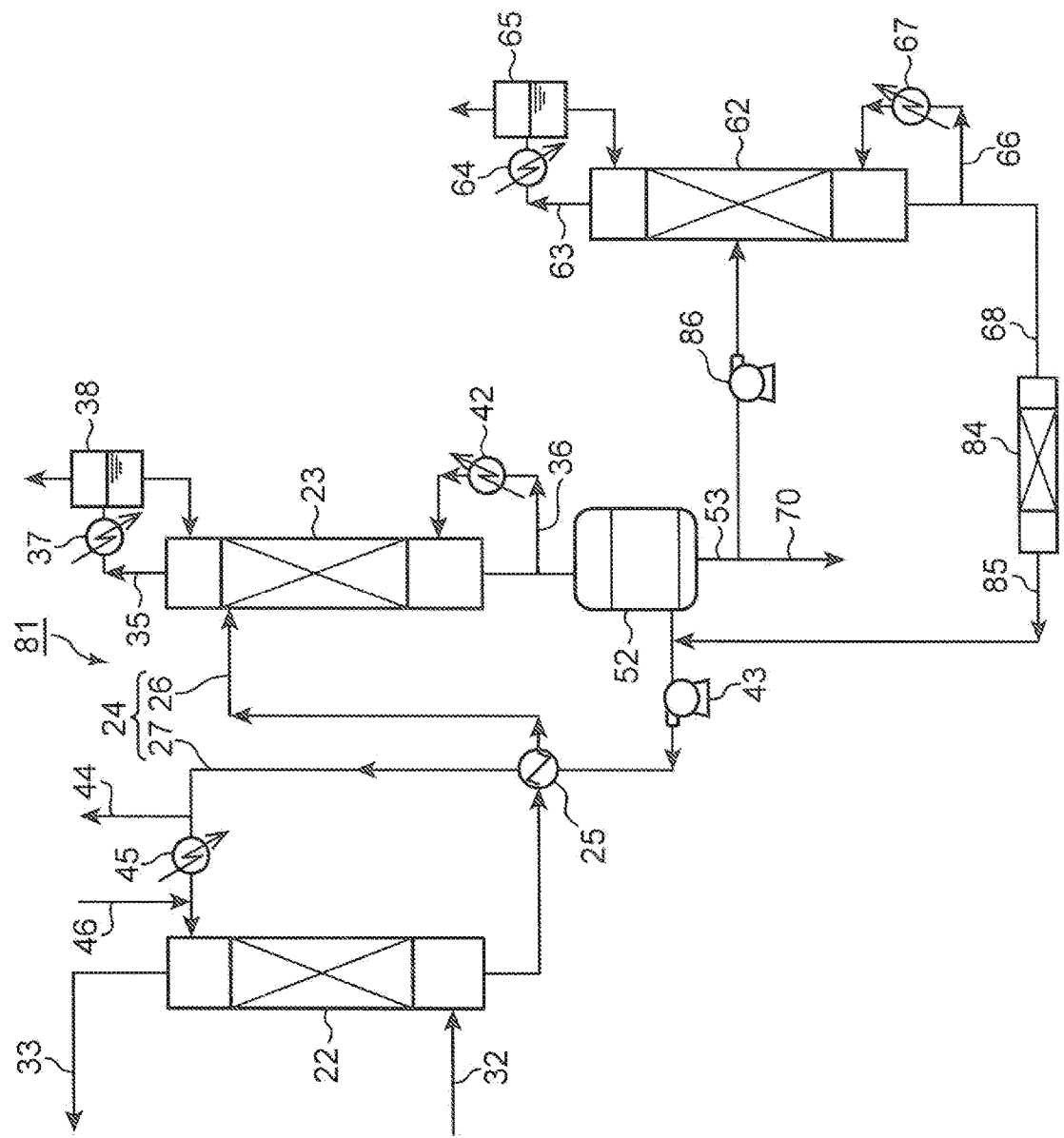
FIG. 8 is a schematic view showing another example of the gas treatment apparatus according to the embodiment of the present invention.

Examples of another apparatus that performs the gas treatment method include a gas treatment apparatus 81 that is similar to the gas treatment apparatus 41 except that the gas treatment apparatus 81 includes a second recovery device 84 that adsorbs and recovers the sulfur compound not released by the second release device 62 from the absorption liquid after releasing the sulfur compound by the second release device 62, as shown in FIG. 8. FIG. 8 is a schematic view showing another example of the gas treatment apparatus 81 according to the present embodiment.

In the gas treatment apparatus 81, specifically, the third flow channel 68 includes the second recovery device 84. The third flow channel 68 and a fifth flow channel 85 are connected to the second recovery device 84. The third flow channel 68 can introduce the absorption liquid led out of the second release device 62 into the second recovery device 84. The fifth flow channel 85 can supply the absorption liquid having passed through the second recovery device 84 to the second flow channel 27.

The second recovery device 84 is the second recovery device used in the second recovery step described above, and is a recovery device that adsorbs and recovers the sulfur compound from the absorption liquid led out of the second release device 62. Specific examples of the second recovery device 84 include those similar to the first recovery device used in the first recovery step. In the gas treatment apparatus 81, the second recovery device 84 is horizontally placed, but may be vertically placed, The gas treatment apparatus 81 can perform the absorption step in the absorption device 22, the first release step in the first release device 23, the second release step in the second release device 62, the circulation step in the phase separator 52, the circulation channel 24, and the third flow channel 68, and further the second recovery step in the second recovery device 84. Therefore, the gas treatment apparatus 81 can individually recover the carbon dioxide and the sulfur compound from the gas to be treated. Furthermore, even when the absorption liquid is used for a long period of time to recover the carbon dioxide and the sulfur compound, the exchange frequency of the absorption liquid can be reduced, and the amount of an absorption liquid newly supplied can be reduced.

The gas treatment apparatus may include any one of the first recovery device and the second recovery device as described above, but may include both the first recovery device and the second recovery device as described later.

Figure 9:
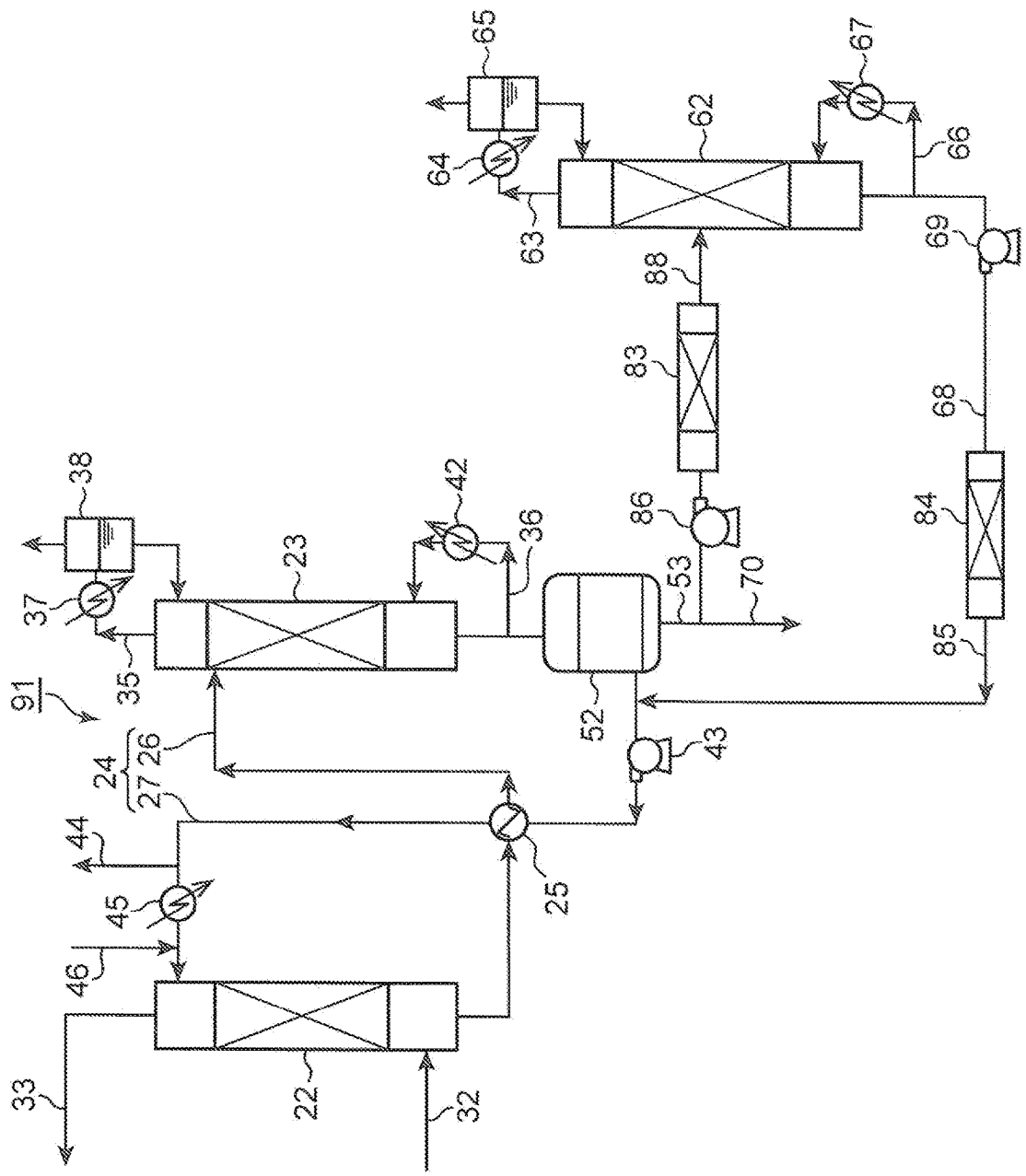
FIG. 9 is a schematic view showing another example of the gas treatment apparatus according to the embodiment of the present invention.

Examples of another apparatus that performs the gas treatment method include a gas treatment apparatus 91 that is similar to the gas treatment apparatus 81 except that the gas treatment apparatus 91 includes a first recovery device 83 that adsorbs and recovers the sulfur compound from the absorption liquid after the carbon dioxide is released by the first release device 23, as shown in FIG. 9. As described above, the third flow channel 68 may include a pump, and in the gas treatment apparatus shown in FIG. 9, the third flow channel 68 includes a pump 69. FIG. 9 is a schematic view showing another example of the gas treatment apparatus 91 according to the present embodiment.

The gas treatment apparatus 91 can perform the absorption step in the absorption device 22, the first release step in the first release device 23, the second release step in the second release device 62, the circulation step in the phase separator 52, the circulation channel 24, and the third flow channel 68, the first recovery step in the first recovery device 83, and further the second recovery step in the second recovery device 84. Therefore, the gas treatment apparatus 91 can individually recover the carbon dioxide and the sulfur compound from the gas to be treated. Furthermore, even when the absorption liquid is used for a long period of time to recover the carbon dioxide and the sulfur compound, the exchange frequency of the absorption liquid can be reduced, and the amount of an absorption liquid newly supplied can be reduced.

As described above, the present specification discloses techniques of various aspects, among which main techniques are summarized below.

An aspect of the present invention is a gas treatment method including: an absorption step of bringing a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release step of heating the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid.

According to such a configuration, in the absorption step, by bringing the gas to be treated into contact with the absorption liquid, the carbon dioxide contained in the gas to be treated is absorbed by the absorption liquid, and the sulfur compound contained in the gas to be treated is also absorbed.

In the first release step, the carbon dioxide is released from the absorption liquid by heating the absorption liquid that has absorbed the carbon dioxide and the sulfur compound. In the first release step, the absorption liquid is heated to the temperature equal to or higher than a temperature at which the carbon dioxide absorbed by the absorption liquid is released from the absorption liquid, whereby the carbon dioxide can be released from the absorption liquid. The carbon dioxide released from the absorption liquid is separated from the absorption liquid, whereby the carbon dioxide can be recovered.

The gas to be treated includes a gas that is less likely to be absorbed by an absorption liquid phase-separated by carbon dioxide absorption, for example, nitrogen. A gas not absorbed by the absorption liquid is not released even when the absorption liquid is heated in the first release step.

Furthermore, the heating in the first release step is heating at the temperature lower than a temperature at which the sulfur compound absorbed by the absorption liquid is released from the absorption liquid, whereby the release of the sulfur compound is sufficiently suppressed even if the sulfur compound is contained in the gas to be treated.

Therefore, in the first release step, not only the release of the gas that is less likely to be absorbed by the absorption liquid but also the release of the sulfur compound absorbed by the absorption liquid is sufficiently suppressed.

From the above, in the gas treatment method, the carbon dioxide is preferentially released from the gas to be treated, which contains not only the carbon dioxide but also the sulfur compound. That is, in the gas treatment method, the mixing of the gas that is less likely to be absorbed by the absorption liquid and the sulfur compound into the gas released from the absorption liquid can be sufficiently suppressed. Therefore, in the gas treatment method, even if the sulfur compound is contained in the gas to be treated, or the sulfur compound is not removed in advance from the gas to be treated by a desulfurization device or the like, high-concentration carbon dioxide can be recovered.

In a gas treatment apparatus capable of recovering $CO_2$ ($CO_2$ recovery apparatus) by a chemical absorption method, as described above, even if a gas to be treated, which contains a sulfur compound, is treated, the amount of the sulfur compound accumulated in the apparatus is also required to be small. In the gas treatment method, by separately performing a treatment of removing the sulfur compound from the absorption liquid after recovering the carbon dioxide, the accumulation of the sulfur compound contained in the absorption liquid in the apparatus for performing the gas treatment method can also be suppressed by, for example, the following configuration.

The gas treatment method may further include a first recovery step of adsorbing and recovering the sulfur compound from the absorption liquid after the first release step after releasing the carbon dioxide from the absorption liquid in the first release step.

According to such a configuration, in the first recovery step, the sulfur compound can be adsorbed and recovered from the absorption liquid after the first release step, that is, the absorption liquid after the carbon dioxide is released. Therefore, according to this gas treatment method, not only the high-concentration carbon dioxide can be recovered, but also the sulfur compound can be removed from the absorption liquid after the recovery of the carbon dioxide. This makes it possible to suppress the accumulation of the sulfur compound contained in the absorption liquid.

The gas treatment method may further include a second release step of heating the absorption liquid after the first release step to a temperature equal to or higher than a temperature at which the sulfur compound absorbed by the absorption liquid is released from the absorption liquid after releasing the carbon dioxide from the absorption liquid in the first release step, to release the sulfur compound from the absorption liquid.

According to such a configuration, the sulfur compound can be released from the absorption liquid by heating the absorption liquid after the first release step, that is, the absorption liquid after the carbon dioxide is released to a temperature equal to or higher than a temperature at which the sulfur compound absorbed by the absorption liquid is released from the absorption liquid in the second release step. Therefore, according to this gas treatment method, not only the high-concentration carbon dioxide can be recovered, but also the sulfur compound can be removed from the absorption liquid after the recovery of the carbon dioxide. This makes it possible to suppress the accumulation of the sulfur compound contained in the absorption liquid.

In the second release step, all of the sulfur compound may not be released from the absorption liquid after the first release step. In such a case, in the gas treatment method, by separately performing a treatment of removing the sulfur compound from the absorption liquid after the second release step, the accumulation of the sulfur compound contained in the absorption liquid in the apparatus for performing the gas treatment method can be further suppressed by, for example, the following configuration.

The gas treatment method may further include a second recovery step of releasing the sulfur compound from the absorption liquid in the second release step, and then adsorbing and recovering the sulfur compound not released in the second release step from the absorption liquid after the second release step.

According to such a configuration, in the second recovery step, the sulfur compound not released in the second release step can be adsorbed and recovered from the absorption liquid after the second release step, that is, the absorption liquid after the sulfur compound is released. Therefore, according to this gas treatment method, not only the high-concentration carbon dioxide can be recovered, but also the sulfur compound can be further removed from the absorption liquid after the recovery of the carbon dioxide. This makes it possible to further suppress the accumulation of the sulfur compound contained in the absorption liquid.

The reason why the gas treatment method includes the second recovery step is that the sulfur compound can be further removed from the absorption liquid after recovering the carbon dioxide as described above. More specifically, the cost required in the removal of the sulfur compound from the absorption liquid in the second release step tends to be lower than that in the second recovery step. Therefore, removing the sulfur compound remaining in the absorption liquid in the second recovery step after removing the sulfur compound from the absorption liquid in the second release step is advantageous not only in that the sulfur compound can be further removed from the absorption liquid but also in terms of cost. By removing the sulfur compound contained in the absorption liquid in advance in the first recovery step before removing the sulfur compound from the absorption liquid in the second release step, the sulfur compound can be further removed from the absorption liquid.

In the first recovery step and the second recovery step, a degraded product of an absorption liquid component such as an amine contained in the absorption liquid, or metal ions formed as a result of corrosion, or the like may be also removed.

In the gas treatment method, the absorption liquid may be phase-separated also by absorption of the sulfur compound, in the absorption step, the absorption liquid may be phase-separated into a first phase portion and a second phase portion by absorption of the carbon dioxide and the sulfur compound, a content rate of the carbon dioxide and the sulfur compound in the first phase portion may be higher than a content rate of the carbon dioxide and the sulfur compound in the second phase portion, and the second release step may be a step of heating the first phase portion after the carbon dioxide is released from the absorption liquid in the first release step.

According to such a configuration, in the absorption step, by the absorption of the carbon dioxide and the sulfur compound, the absorption liquid is phase-separated into the first phase portion having a relatively high content rate of the carbon dioxide and the sulfur compound and the second phase portion having a relatively low content rate of the carbon dioxide and the sulfur compound. Even in the first phase portion after the carbon dioxide is released from the absorption liquid in the first release step, the content rate of the sulfur compound in the first phase portion is higher than the content rate of the sulfur compound in the second phase portion. In the second release step, the sulfur compound is released from the absorption liquid by heating the first phase portion having a relatively high content rate of the sulfur compound, whereby the sulfur compound can be efficiently released from the absorption liquid.

The gas treatment method may further include a step of discarding at least a part of the first phase portion after the first release step, and using the absorption liquid other than the discarded first phase portion as an absorption liquid to be brought into contact with the gas to be treated in the absorption step.

According to such a configuration, by discarding at least a part of the first phase portion having a relatively high content rate of the sulfur compound, the sulfur compound can be efficiently discarded.

As described above, the sulfur compound promotes an irreversible deterioration reaction of a component contained in the absorption liquid, for example, an amine. That is, the sulfur compound deteriorates the component contained in the absorption liquid, and generates a degraded product of the absorption liquid component. Therefore, when the absorption liquid is used for the recovery of the carbon dioxide for a long period of time by use of the absorption liquid after releasing the carbon dioxide again in the absorption step, or the like, the amount of the degraded product of the absorption liquid component generated in the absorption liquid increases. For this reason, at least a part of the used absorption liquid is discarded and replaced with a new absorption liquid. As the discard, by discarding the first phase portion having a relatively high content rate of the sulfur compound, not only the sulfur compound can be efficiently discarded, but also the degraded product can also be efficiently discarded.

The absorption liquid other than the discarded first phase portion is used as the absorption liquid to be brought into contact with the gas to be treated in the absorption step, whereby the carbon dioxide can be recovered by using the absorption liquid having a relatively low content rate of the sulfur compound and the degraded product.

The absorption liquid after releasing the carbon dioxide is used again in the absorption step, whereby the amounts of the sulfur compound and the degraded product remaining in the absorption liquid can be kept low even if the absorption liquid is used for the recovery of the carbon dioxide for a long period of time. This makes it possible to reduce the exchange frequency of the absorption liquid, to reduce the amount of a new absorption liquid added, and to reduce the amount of the absorption liquid used. Specifically, when the absorption liquid is used for the recovery of the carbon dioxide over a long period of time, the first phase portion having a relatively high content rate of the sulfur compound is discarded, and a new absorption liquid is added in an amount corresponding to the discarded amount, whereby the amount of the absorption liquid used can be reduced.

Another aspect of the present invention is a gas treatment apparatus including: an absorption device that brings a gas to be treated, which contains carbon dioxide and a sulfur compound, into contact with an absorption liquid to be phase-separated by carbon dioxide absorption, to cause the absorption liquid to absorb the carbon dioxide and the sulfur compound; and a first release device that heats the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid.

According to such a configuration, even if not only the carbon dioxide but also the sulfur compound is absorbed by the absorption liquid in the absorption device, the carbon dioxide can be preferentially released from the absorption liquid by the first absorption device. The gas not absorbed by the absorption liquid is not released even if the absorption liquid is heated by the first release device. Therefore, in the first release device, not only the release of the gas that is less likely to be absorbed by the absorption liquid but also the release of the sulfur compound absorbed by the absorption liquid is sufficiently suppressed. That is, in the gas treatment apparatus, the carbon dioxide is preferentially released from the gas to be treated, which contains not only the carbon dioxide but also the sulfur compound. Therefore, the high-concentration carbon dioxide can be recovered from the gas to be treated.

Consequently, the gas treatment apparatus can recover the high-concentration carbon dioxide even if the sulfur compound is contained in the gas to be treated, or the sulfur compound is not removed in advance from the gas to be treated by the desulfurization device or the like. In the gas treatment apparatus, by separately performing a treatment of removing the sulfur compound from the absorption liquid after recovering the carbon dioxide, the accumulation of the sulfur compound contained in the absorption liquid in the gas treatment apparatus can also be suppressed by, for example, the following configuration.

The gas treatment apparatus may further include a first recovery device that adsorbs and recovers the sulfur compound from the absorption liquid after the carbon dioxide is released by the first release device.

According to such a configuration, in the first recovery device, the sulfur compound can be adsorbed and recovered from the absorption liquid after the carbon dioxide is released by the first release device. Therefore, according to this gas treatment apparatus, not only the high-concentration carbon dioxide can be recovered, but also the sulfur compound can be removed from the absorption liquid after the recovery of the carbon dioxide. This makes it possible to suppress the accumulation of the sulfur compound contained in the absorption liquid.

When the gas treatment apparatus includes the first recovery device, it is preferable that the first recovery device includes an adsorbent capable of adsorbing the sulfur compound, and the adsorbent contains at least one selected from the group consisting of a metal adsorbent, a resin adsorbent, an inorganic adsorbent, and a physical adsorbent.

With such a configuration, the sulfur compound can be more efficiently adsorbed and recovered from the absorption liquid after the carbon dioxide is released by the first release device. Therefore, the accumulation of the sulfur compound contained in the absorption liquid can be further suppressed.

In the gas treatment apparatus, the first recovery device may be horizontally placed such that a longitudinal direction of the first recovery device is a horizontal direction, or vertically placed such that the longitudinal direction of the first recovery device is a vertical direction.

The gas treatment apparatus may further include a second release device that heats the absorption liquid after releasing the carbon dioxide by the first release device to a temperature equal to or higher than a temperature at which the sulfur compound absorbed by the absorption liquid is released from the absorption liquid, to release the sulfur compound from the absorption liquid.

According to such a configuration, the sulfur compound can be released from the absorption liquid by heating the absorption liquid after the carbon dioxide is released in the first release device to the temperature equal to or higher than a temperature at which the sulfur compound absorbed by the absorption liquid is released from the absorption liquid in the second release device. Therefore, according to this gas treatment apparatus, not only the high-concentration carbon dioxide can be recovered, but also the sulfur compound can be removed from the absorption liquid after the recovery of the carbon dioxide. This makes it possible to suppress the accumulation of the sulfur compound contained in the absorption liquid.

The second release device may not be able to release all of the sulfur compound from the absorption liquid after the carbon dioxide is released by the first release device. In such a case, in the gas treatment apparatus, by separately subjecting the absorption liquid after releasing the sulfur compound by the second release device to a treatment for removing the sulfur compound, the accumulation of the sulfur compound contained in the absorption liquid in the gas treatment apparatus can be further suppressed by, for example, the following configuration.

The gas treatment apparatus may further include a second recovery device that adsorbs and recovers the sulfur compound not released by the second release device from the absorption liquid after the sulfur compound is released by the second release device.

According to such a configuration, in the second recovery device, the sulfur compound not released by the second release device can be adsorbed and recovered from the absorption liquid after the sulfur compound is released by the second release device. Therefore, according to this gas treatment apparatus, not only the high-concentration carbon dioxide can be recovered, but also the sulfur compound can be further removed from the absorption liquid after the recovery of the carbon dioxide. This makes it possible to further suppress the accumulation of the sulfur compound contained in the absorption liquid.

The reason why the gas treatment apparatus includes the second recovery device is that the sulfur compound can be further removed from the absorption liquid after the recovery of the carbon dioxide as described above. More specifically, the cost required for removing the sulfur compound from the absorption liquid by the second release device tends to be lower than that required for removing the sulfur compound by the second recovery device. Therefore, removing the sulfur compound remaining in the absorption liquid by the second recovery device after removing the sulfur compound from the absorption liquid by the second release device is advantageous not only in that the sulfur compound can be further removed from the absorption liquid but also in terms of cost. By removing the sulfur compound contained in the absorption liquid in advance by the first recovery device before removing the sulfur compound from the absorption liquid by the second release device, the sulfur compound can be further removed from the absorption liquid.

In the treatment in the first recovery device and the treatment in the second recovery device, a degraded product of an absorption liquid component such as an amine contained in the absorption liquid, or metal ions formed as a result of corrosion, or the like may be removed.

In the gas treatment apparatus, the absorption liquid may be phase-separated also by absorption of the sulfur compound. In the absorption device, the absorption liquid may be phase-separated into a first phase portion and a second phase portion by absorption of the carbon dioxide and the sulfur compound, a content rate of the carbon dioxide and the sulfur compound in the first phase portion may be higher than a content rate of the carbon dioxide and the sulfur compound in the second phase portion, and the second release device may heat the first phase portion after the carbon dioxide is released from the absorption liquid by the first release device.

According to such a configuration, even in the first phase portion after the carbon dioxide is released from the absorption liquid by the first release device, the content rate of the sulfur compound in the first phase portion is higher than the content rate of the sulfur compound in the second phase portion. By heating the first phase portion having a relatively high content rate of the sulfur compound by the second release device, the sulfur compound is released from the absorption liquid, whereby the sulfur compound can be efficiently released from the absorption liquid.

When the gas treatment apparatus includes the second recovery device, it is preferable that the second recovery device includes an adsorbent capable of adsorbing the sulfur compound, and the adsorbent contains at least one selected from the group consisting of a metal adsorbent, a resin adsorbent, an inorganic adsorbent, and a physical adsorbent.

With such a configuration, the sulfur compound can be more efficiently adsorbed and recovered from the absorption liquid after the sulfur compound is released by the second release device. Therefore, the accumulation of the sulfur compound contained in the absorption liquid can be further suppressed.

In the gas treatment apparatus, the first recovery device and the second recovery deice may be horizontally placed such that a longitudinal direction of the first recovery device and the second recovery device is a horizontal direction, or vertically placed such that the longitudinal direction of the first recovery device and the second recovery device is a vertical direction.

The gas treatment apparatus may further include a mechanism that discards at least a part of the first phase portion after the carbon dioxide is released from the absorption liquid by the first release device, and uses the absorption liquid other than the discarded first phase portion as an absorption liquid to be brought into contact with the gas to be treated in the absorption device.

According to such a configuration, by discarding at least a part of the first phase portion having a relatively high content rate of the sulfur compound, not only the sulfur compound can be efficiently discarded, but also the degraded product can be efficiently discarded. By using the absorption liquid other than the discarded first phase portion as an absorption liquid to be brought into contact with the gas to be treated in the absorption device, the carbon dioxide can be recovered using the absorption liquid having a relatively low content rate of the sulfur compound and the degraded product. The absorption liquid after releasing the carbon dioxide is used again in the absorption step, whereby the amounts of the sulfur compound and the degraded product remaining in the absorption liquid can be kept low even if the absorption liquid is used for the recovery of the carbon dioxide for a long period of time. This makes it possible to reduce the exchange frequency of the absorption liquid, to reduce the amount of a new absorption liquid added, and to reduce the amount of the absorption liquid used. Specifically, when the absorption liquid is used for the recovery of the carbon dioxide over a long period of time, the first phase portion having a relatively high content rate of the sulfur compound is discarded, and a new absorption liquid is added in an amount corresponding to the discarded amount, whereby the amount of the absorption liquid used can be reduced.

According to the present invention, it is possible to provide a gas treatment method and a gas treatment apparatus capable of recovering high-concentration carbon dioxide.

This application is based on Japanese Patent Application No. 2019-099533 filed on May 28, 2019, and Japanese Patent Application No. 2020-001034 filed on Jan. 7, 2020, the contents of which are included in the present application.

The present invention has been appropriately and sufficiently described above by way of the embodiment while referring to the drawings described above, for the purpose of illustrating the present invention. A person skilled in the art should recognize, however, that the embodiment described above can be easily modified and/or improved. Therefore, it is understood that any modified embodiments or improved embodiments conducted by a person skilled in the art are encompassed within the scope as claimed in the appended claims, so long as these modifications and improvements do not depart from the scope of the claims.

INDUSTRIAL APPLICABILITY

According to the present invention, a gas treatment method and a gas treatment apparatus capable of recovering high-concentration carbon dioxide are provided.

The invention claimed is:

1. A gas treatment method comprising:
an absorption step of bringing a gas to be treated, which contains carbon dioxide and a sulfur compound, into contact with an absorption liquid to be phase-separated by not only carbon dioxide absorption but also sulfur compound absorption, to cause the absorption liquid to absorb the carbon dioxide and the sulfur compound, wherein the absorption liquid is phase-separated into a first phase portion and a second phase portion by absorption of the carbon dioxide and the sulfur compound, and a content rate of the carbon dioxide and the sulfur compound in the first phase portion is higher than a content rate of the carbon dioxide and the sulfur compound in the second phase portion;
a first release step of heating the first and second phase portions to a temperature equal to or higher than a temperature at which the carbon dioxide absorbed by the first and second phase portions is released from the first and second phase portions and lower than a temperature at which the sulfur compound absorbed by the first and second phase portions is released from the first and second phase portions, to release the carbon dioxide from the first and second phase portions; and
a second release step of heating the first phase portion after the first release step to a temperature equal to or higher than a temperature at which the sulfur compound absorbed by the first phase portion is released from the first phase portion after releasing the carbon dioxide from the first phase portion in the first release step, to release the sulfur compound from the first phase portion.

2. The gas treatment method according to claim 1, further comprising a second recovery step of releasing the sulfur compound from the first phase portion in the second release step, and then adsorbing and recovering the sulfur compound not released in the second release step from the first phase portion after the second release step.

3. A gas treatment method comprising:
an absorption step of bringing a gas to be treated, which contains carbon dioxide and a sulfur compound, into contact with an absorption liquid to be phase-separated by not only carbon dioxide absorption but also sulfur compound absorption, to cause the absorption liquid to absorb the carbon dioxide and the sulfur compound, wherein in the absorption step, the absorption liquid is phase-separated into a first phase portion and a second phase portion by absorption of the carbon dioxide and the sulfur compound, and a content rate of the carbon dioxide and the sulfur compound in the first phase portion is higher than a content rate of the carbon dioxide and the sulfur compound in the second phase portion;

a first release step of heating the absorption liquid brought into contact with the gas to be treated to a temperature equal to or higher than a temperature at which the carbon dioxide absorbed by the absorption liquid is released from the absorption liquid and lower than a temperature at which the sulfur compound absorbed by the absorption liquid is released from the absorption liquid, to release the carbon dioxide from the absorption liquid; and a step of discarding at least a part of the first phase portion after the first release step, and using the absorption liquid other than the discarded first phase portion as an absorption liquid to be brought into contact with the gas to be treated in the absorption step.

* * * * *